United States Patent [19]
Frenkel et al.

[11] Patent Number: 5,889,729
[45] Date of Patent: Mar. 30, 1999

[54] WELL LOGGING DATA INTERPRETATION SYSTEMS AND METHODS

[75] Inventors: Michael A. Frenkel; Alberto G. Mezzatesta, both of Houston, Tex.

[73] Assignee: Western Atlas International, Inc., Houston, Tex.

[21] Appl. No.: 723,037

[22] Filed: Sep. 30, 1996

[51] Int. Cl.$^6$ .................................................. G01V 1/00
[52] U.S. Cl. ................................................................ 367/73
[58] Field of Search ................................. 367/73; 702/14

[56] References Cited

PUBLICATIONS

Tarantola, Albert, *Inverse Problem Theory*, Elsevier Publishing Co., Amsterdam, 1987.
Lester Ingber et al, *Genetic Algorithms and Very Fast Simulated Reannealing: A Comparison*, Mathematic and Computer Modeling, 18(11) 1992, pp. 87–100.
Jupp, D.L.B. et al., *Stable Iterative Methods for the Inversion of Geophysical Data*, Geophysical Journal of the Royal Astronomical Society, vol. 42, pp. 957–976 (1975).
Lines, L.R. et al., *Tutorial: A Review of Least–Squares Inversion and its Application to Geophysical Problems*, Geophysical Prospecting, vol. 32, pp. 158–188, 1983.
Mezzatesta, A. et al., *Integrated 2–D Interpretation of Resistivity Logging Measurements by Inversion Methods*, Jun. 1995 Logging Symposium, Society of Professional Well Log Analysts, Houston, TX.
Press, W.H. et al., *Numerical Receipts in Fortran*, Cambridge University Press, 1992, pp. 854–860.
Smith, J. Torqil et al., *Rapid Inversion of Two–and–Three–Dimensional Magnetotellurie Data*, Journal of Geophysical Research, vol. 96, No. B3, pp. 3905–3922, 1991.
Druskin et al., *About One Iterative Algorithm for Solving Two–Dimensional Inverse Problem of Logging by Lateral Sounding*, Geology and Geophysics, No. 9, pp. 119–123 (English language abstract on p. 123) 1987.

*Primary Examiner*—John Barlow
*Assistant Examiner*—Anthony Jolly
*Attorney, Agent, or Firm*—Guy McClung; Richard A. Fagin

[57] ABSTRACT

A system has been invented for producing a final earth model of part of an earth formation having N (one or more) layers, the method including, in one aspect, generating an initial earth model based on raw data produced by a wellbore logging tool at a location in a borehole through the earth, performing 2-D forward modeling on the initial earth model to produce an interim earth model that includes a set of synthetic tool responses data for the wellbore logging tool, comparing the synthetic tool response data to the raw data to determine whether there is misfit between them; if misfit between the synthetic tool response data and the raw data is acceptable, saving and storing the interim earth model as the final earth model; if misfit between the synthetic tool response data and the raw data is unacceptable, performing 1-D forward modeling N times on the interim earth model, producing a secondary earth model; performing 1-D inversion on the secondary earth model; and either saving the secondary earth model as the final earth model or re-subjecting the secondary earth model to 2-D forward modeling and subsequent misfit comparison. In one aspect the data is overcorrected following the N times 1-D forward modeling step. In one aspect the N times 1-D forward modeling step is accomplished by using a look-up table of stored values for synthetic tool responses. In one aspect the N time 1-D inversion step is accomplished by using such a look-up table.

40 Claims, 6 Drawing Sheets

WELL LOGGING DATA INTERPRETATION SYSTEMS AND METHODS

BACKGROUND OF THE INVENTION

1. Field of the Invention

This invention is directed to well logging data interpretation systems and methods and, in one particular aspect, to a data inversion system and method that is usable at a well site to determine formation parameters and reservoir descriptions.

2. Description of Related Art

In certain prior art systems and methods well logging data is interpreted and evaluated to provide a picture or model of formations and of reservoirs to facilitate the removal of hydrocarbons, and to enhance the process of formation evaluation. Prior art well logging systems and methods provide a variety of data about formations through which the well extends; including, for example, resistivity data (induction and galvanic), acoustic data, vertical seismic profiling data, magnetic data, gravimetric data, temperature data, nuclear data, etc.

Inversion provides an estimate of the material properties of a formation by updating and improving an initial earth model, containing a material property description of the subsurface, with a better model until an optimal model is obtained. An instrument response numerically calculated from a model is compared to the response actually measured by instruments; if they match, the model is a correct one. If they do not match, the model is changed, to improve the match between what is measured and what is calculated from the model. The update of model parameters can be performed by known linear ("Inverse Problem Theory", Tarantola, 1987) or non-linear optimization methods ("Genetic Algorithms and Very Fast Simulated Annealing", Ingber and Rosen, 1992). Numerical calculation of well logging tool responses is relatively slow, even on powerful computers when using wave propagation, potential, nuclear or electromagnetic field theory.

Known two-dimensional (2-D) inversion techniques are used to interpret resistivity well logging data. These techniques simultaneously consider the borehole parameters, invasion parameters, and shoulder-bed effects with respect to a set of resistivity well logging measurements. However, certain conventional 2-D inversion techniques for such data require significant computer power and computational time and are not available at a well site.

The computational time required by certain known conventional 2-D inversion methods for well logging data based on linearized or non-linear inversion schemes grows very rapidly with the complexity of the earth model and the number of logging depths. For example, the well-known generalized least-squares technique (based on a local linearization of a non-linear inverse problem) requires performing very time-consuming multiple 2-D forward modeling at each iteration of the inversion procedure in order to calculate the Jacobian matrix (Stable iterative methods for the inversion of geophysical data: Geoph. J. Royal Astr. Soc., 42, 957–976, Jupp and Vozoff, 1975; A review of least-squares inversion and its application to geophysical problems: Geoph. Prosp., 32, 159–186, Lines and Treitel, 1984). This type of inversion technique is used for 2-D inversion of resistivity well logging data at stationary Log Analysis Centers. Some examples of applications of the generalized least-squares technique for 2-D inversion of resistivity logging data are presented in Integrated 2-D interpretation of resistivity logging measurements by inversion methods: Presented at the 36th Annual SPWLA Logging Symposium in June, 1995, Mezzatesta et al.

A rapid 2-D inversion method has been applied to Russian lateral resistivity (BKZ) logging data (About one iterative algorithm for solving two-dimensional inverse problem of logging by lateral sounding: Geology and Geophysics, 9, 118–123, Druskin and Knizhnerman, 1987). A similar method was applied to magnetotelluric data (Rapid inversion of two- and three-dimensional magnetotelluric data: J. Geoph. Res., 96,3905–3922, Smith and Booker, 1991).

The inversion of logging data determines the distribution of resistivity around a borehole in both the radial and vertical directions. The results of the inversion are normally presented in terms of a sequence of N layers, each one identified by its thickness and radial distribution of resistivities (step profile, annulus, ramp, etc.). One rapid 2-D method for processing data for a formation is an iterative procedure, each iteration consisting of the following steps as shown in FIG. 1: i) An initial earth model is developed based on raw data ("Set Initial Earth Model") and the 2-D forward modeling based on the initial earth model is done to calculate synthetic tool responses to produce synthetic data ["Compute one time 2-D responses (1 depth per layer)"]; ii) if a misfit between raw actual data and synthetic data from the model ("COMPUTE DATA MISFIT") is acceptable ("Misfit accepted ? yes") the model is accepted ("END"); if not ("no", iii) calculate N times (N=number of layers in the formation under study) (one-dimensional) responses at each layer (assuming the layer is infinitely thick, i.e. no layers above or below it) ["Compute N times 1-D tool response (using numerical modeling)"]; (iv) a correction ["Perform data correction (shoulder bed correction)"] of the logging data is done for shoulder bed effects based on formation parameters obtained from previous steps; v) N times 1-D inversions using numerical forward modeling procedures are done, for each layer (second lowest box, FIG. 1), using the corrected field data from the previous step ["Perform N times 1-D inversion (using numerical modeling)"]. Each iteration (i–v, above) provides a new set of formation parameters ("Update Earth Model"). The iterative cycle is repeated until the misfit between synthetic and raw (measured, without any correction) data becomes less than some predetermined acceptable small value (e.g. within the range of uncertainty of the data, typically 5% or less). Following the 1-D inversions of corrected data, the corrected 1-D earth model parameters for each layer are combined in a new, and possibly finally, 2-D earth model. This 2-D earth model is then subjected to the 2-D FORWARD MODELLING and 1-D FORWARD MODELLING steps and, if it is acceptable, the process ends ("END") with a new earth model. The rapid 2-D inversion requires less computational time than certain conventional techniques; however, both the conventional and the rapid 2-D inversion methods alone do not make well logging data inversion practical at a well site. Overcorrection is a known numerical calculation technique (see, e.g., §19.5, Numerical Recipes in Fortran, Press et al, Cambridge Univ. Press, Second Edition, 1992, incorporated fully herein by reference, pp. 854–860).

There has long been a need, recognized by the present inventors, for a well logging data interpretation system and method useful at a well site. There has long been a need for such a system and method in which required computation time is significantly reduced. There has long been a need for such a system and method which is able to take into account significantly more data and more types of different data related to a formation under study.

SUMMARY OF THE PRESENT INVENTION

The present invention, in certain embodiments, discloses a system for acquiring and interpreting wellbore logging data and a method for such interpretation which is significantly faster than previously known methods and which can be used at a well site. Prior art inversion processes are limited to the use of resistivity data. Processes according to the present invention deal with a wide variety of data, including, but not limited to, resistivity data, acoustic data, magnetic data, gravity data, and vertical seismic profiling data—each produced by a respective type of wellbore logging tool.

A wellbore logging tool in a borehole acquires a set of raw data at many depths per layer for a number of specific points in a formation, and provides for information points in a specific cylindrical volume around part of the borehole. To produce a model for the cylindrical volume in the formation, one method according to the present invention includes (see FIG. 2): generation of an initial earth model ("Set Initial Earth Model") based on the initial raw data and using specific values therefrom; then 2-D forward modeling is done at many depths per layer on the initial earth model ("Compute one time 2-d responses (many depths per layer)"; comparison (e.g. using a computer) of synthetic tool response data resulting from the previous step with actual raw data ("Compare Data Misfit"), and misfit, if any, is determined between the raw data and the synthetic tool response data of the earth model; if the amount of misfit is acceptable ("yes"), storing the initial earth model ("END"), or, if the amount of misfit is not acceptable ("no"), one-dimensional forward modeling for each formation layer is done N times ("Compute n times 1-d tool response using numerical modeling"), where N is the number of layers for which data is available in the initial original data set of the initial earth model, thus producing a set of one dimensional tool responses for the current earth model; two-dimensional corrections are then made to the raw data to take into account previously unaccounted for actual shoulder bed effects at several depths per layer ("Perform data correction shoulder bed correction on several depths per layer"); corrected data for each layer is then subjected to a one-dimensional inversion process ("Perform N times 1-D inversion using numerical modeling & data from many depth levels" second box, from bottom, FIG. 2), to produce a new earth model using pre-calculated look-up tables of tool responses stored in the computer's memory (which take into account actual borehole and invasion effects) for the specific tool which acquired the initial original data set; and the resulting model ("Update Earth Model") is then subjected to 2-D forward modeling and, if necessary, 1-D forward modeling described above and a misfit comparison is done. If necessary, the process is repeated until a model with an acceptable raw-data/synthetic-data misfit is obtained.

Numerical estimations show that certain 1-D forward modeling techniques take up to 90% of the total computational time required by the original scheme (e.g. as in FIG. 5) of the rapid 2-D inversion method (e.g. as used in the system of FIG. 1). In order to avoid 1-D numerical calculations ("1-D tool response" and "1-D Inversion") in FIG. 1 and reduce to a minimum the time required by 1-D inversion, precalculated and stored look-up tables of 1-D logging tool responses are used in certain embodiments of the present invention; e.g. stored in a computer's RAM (random access memory). Such processes do not necessarily require any correction, including but not limited to borehole correction, of raw logging data.

In another aspect, the first 1-D forward modeling step (one dimensional numerical forward modeling) is replaced by a step which employs precalculated look-up tables of 1-D logging tool responses for known logging tools (e.g. as in FIG. 3 "Compute N times 2-D tool response using look-up tables", rather than going through the 1-D numerical forward modeling process step. It is also within the scope of this invention to use look-up tables (e.g., step v. in FIG. 3) instead of conducting the numerical 1-D inversion step (step v. of FIG. 2).

In another aspect, the two-dimensional correction step is enhanced by employing an overcorrection technique (e.g. as disclosed generally—although not for wellbore data interpretation or modeling—in Press et al, cited above, incorporated fully herein for all purposes). The use of such an overcorrection technique (e.g. as in FIG. 4 "Perform data correction shoulder bed correction with overcorrection.") improves convergence of the known rapid 2-D inversion method. Overcorrection, preferably, is applied at each iteration of the 2-D inversion procedure. In certain cases this overcorrection step accelerates the convergence of rapid 2-D inversion procedures by several times, e.g. up to five times.

The present invention, in certain embodiments, improves the stability and accuracy of numerical calculation techniques used in methods according to the present invention. The data associated with only one logging depth per layer was used in known schemes of rapid 2-D inversion. According to the present invention, more than only one logging depth per layer may be used, i.e. more data is used in the rapid 2-D inversion. Adding data does not substantially increase the computer time, but adds stability to the inversion and increases the accuracy of the estimated parameters produced by the resulting earth model and may reduce misfit between raw and synthetic data to a more acceptable level.

The well-site inversion method according to the present invention may be used for the inversion of resistivity, acoustic, vertical seismic profiling, magnetic, gravity, temperature, and nuclear logging data; and systems according to this invention may employ any known logging tool to acquire such data. Appropriate 2-D numerical forward modeling routines are used for different types of logging data. The basic scheme of the well-site inversion method (e.g. as in FIGS. 2–5) is the same for all types of data. The methods according to this invention may be used at a well site or at a location remote from a well site.

The present inventors have applied the rapid 2-D inversion method to the inversion of conventional resistivity logging data (Frenkel, M., and Mezzatesta, A. 1995, Rapid 2-D inversion of resistivity logging data: Presented at the 65th SEG Annual Meeting, October 1995; appended copy submitted herewith and incorporated fully herein for all purposes).

The present invention discloses, in certain embodiments, a method for producing a final earth model representing part of an earth formation having N layers (one, two, or more), the method comprising a. generating an initial earth model based on raw data produced by a system including a wellbore logging tool at a location in a formation in a borehole through the earth, b. performing numerical 2-D forward modeling on the initial earth model to produce a set of two-dimensional synthetic tool responses for the wellbore logging tool, c. comparing the synthetic tool responses to the raw data to determine an amount of misfit between them, d. if misfit between the synthetic tool responses and the raw data is acceptable, saving and storing the initial earth model as the final earth model, e. if the misfit between the synthetic tool responses and the raw data is unacceptable, performing 1-D forward modeling on the initial earth model, producing an interim set of one-dimensional synthetic tool responses for the wellbore logging tool, f. overcorrecting the raw data for shoulder bed effects, producing overcorrected raw data, g. performing numerical 1-D inversion of the overcorrected raw data producing a secondary earth model, h. performing numerical 2-D forward modeling on the secondary earth model producing a secondary set of two-dimensional synthetic tool responses for the wellbore logging tool, i. comparing the secondary set of two-dimensional synthetic tool responses to the raw data as initially produced by the wellbore logging tool to determine an amount of misfit between them, j. if misfit between the secondary set of two-dimensional synthetic tool responses and the raw data as initially produced by the wellbore logging tool is acceptable (10% or less, 5% or less, or 1.5% or less), saving and storing the secondary earth model as the final earth model, k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model;

such a method wherein the wellbore logging tool generates raw data from the group consisting of electrical resistivity data, acoustic data, vertical seismic profiling data, magnetic data, gravimetric data, temperature data, seismic data, and nuclear data; such a method wherein the method is conducted at a well site having a wellbore extending into the earth formation, the wellbore logging tool disposed in the wellbore; such a method including conducting a subsequent wellbore operation at the well site based on the final earth model; such a method wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

The present invention, in certain embodiments, discloses a method for producing a final earth model representing part of an earth formation having N layers (one, two or more), the method comprising a. generating an initial earth model based on raw data produced by a system including a wellbore logging tool at a location in a formation in a borehole through the earth, b. performing numerical 2-D forward modeling on the initial earth model to produce a set of two-dimensional synthetic tool responses for the wellbore logging tool, c. comparing the synthetic tool responses to the raw data to determine an amount of misfit between them, d. if misfit between the synthetic tool responses and the raw data is acceptable, saving and storing the initial earth model as the final earth model, e. if the misfit between the synthetic tool responses and the raw data is unacceptable, producing an interim set of one-dimensional synthetic tool responses for the wellbore logging tool by looking up said responses in a look-up table, f. correcting the raw data for shoulder bed effects, producing corrected raw data, g. performing numerical 1-D inversion of the corrected raw data producing a secondary earth model, h. performing numerical 2-D forward modeling on the secondary earth model producing a secondary set of two-dimensional synthetic tool responses for the wellbore logging tool, i. comparing the secondary set of two-dimensional synthetic tool responses to the raw data as initially produced by the wellbore logging tool to determine an amount of misfit between them, j. if misfit between the secondary set of two-dimensional synthetic tool responses and the raw data as initially produced by the wellbore logging tool is acceptable (10% or less, 5% or less, or 1.5% or less), saving and storing the secondary earth model as the final earth model, k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model;

such a method wherein the wellbore logging tool generates raw data from the group consisting of electrical resistivity data, acoustic data, vertical seismic profiling data, magnetic data, gravimetric data, temperature data, seismic data, and nuclear data; such a method wherein the method is conducted at a well site having a wellbore extending into the earth formation, the wellbore logging tool disposed in the wellbore; such a method including conducting a subsequent wellbore operation at the well site based on the final earth model; such a method wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

The present invention discloses, in certain embodiments, a method for producing a final earth model representing part of an earth formation having N layers (one, two, or more), the method comprising a. generating an initial earth model based on raw data produced by a system including a wellbore logging tool at a location in a formation in a borehole through the earth, b. performing numerical 2-D forward modeling on the initial earth model to produce a set of two-dimensional synthetic tool responses for the wellbore logging tool, c. comparing the synthetic tool responses to the raw data to determine an amount of misfit between them, d. if misfit between the synthetic tool responses and the raw data is acceptable, saving and storing the initial earth model as the final earth model, e. if the misfit between the synthetic tool responses and the raw data is unacceptable, performing 1-D forward modeling on the initial earth model, producing an interim set of one-dimensional synthetic tool responses for the wellbore logging tool, f. correcting the raw data for shoulder bed effects, producing corrected raw data, g. producing a secondary earth model by 1-D inversion of the corrected raw data using a look-up table of synthetic tool responses at a plurality of points for each layer of the earth formation, h. performing numerical 2-D forward modeling on the secondary earth model producing a secondary set of two-dimensional synthetic tool responses for the wellbore logging tool, i. comparing the secondary set of two-dimensional synthetic tool responses to the raw data as initially produced by the wellbore logging tool to determine an amount of misfit between them, j. if misfit between the secondary set of two-dimensional synthetic tool responses and the raw data as initially produced by the wellbore logging tool is acceptable (10% or less, 5% or less, 1.5% or less), saving and storing the secondary earth model as the final earth model, k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model;

such a method wherein the wellbore logging tool generates raw data from the group consisting of electrical resistivity data, acoustic data, vertical seismic profiling data, magnetic data, gravimetric data, temperature data, seismic data, and nuclear data; such a method wherein the method is conducted at a well site having a wellbore extending into the earth formation, the wellbore logging tool disposed in the wellbore; such a method including conducting a subsequent wellbore operation at the well site based on the final earth model; such a method wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

The present invention discloses, in certain embodiments, a method for producing a final earth model representing part of an earth formation having N layers (one, two, or more), the method comprising a. generating an initial earth model based on raw data produced by a system including a wellbore logging tool at a location in a formation in a borehole through the earth, b. performing numerical 2-D forward modeling on the initial earth model to produce a set of two-dimensional synthetic tool responses for the wellbore logging tool, c. comparing the synthetic tool responses to the raw data to determine an amount of misfit between them, d. if misfit between the synthetic tool responses and the raw data is acceptable, saving and storing the initial earth model as the final earth model, e. if the misfit between the synthetic tool responses and the raw data is unacceptable, producing an interim set of one-dimensional synthetic tool responses for the wellbore logging tool by looking up said responses in a look-up table, f. overcorrecting the raw data for shoulder bed effects, producing overcorrected raw data, g. producing a secondary earth model by 1-D inversion of the overcorrected raw data using a look-up table of synthetic tool responses at a plurality of points for each layer of the earth formation, h. performing numerical 2-D forward modeling on the secondary earth model producing a secondary set of two-dimensional synthetic tool responses for the wellbore logging tool, i. comparing the secondary set of two-dimensional synthetic tool responses to the raw data as initially produced by the wellbore logging tool to determine an amount of misfit between them, j. if misfit between the secondary set of two-dimensional synthetic tool responses and the raw data as initially produced by the wellbore logging tool is acceptable (10% or less, 5% or less, 1.5% or less), saving and storing the secondary earth model as the final earth model, k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model;

such a method wherein the wellbore logging tool generates raw data from the group consisting of electrical resistivity data, acoustic data, vertical seismic profiling data, magnetic data, gravimetric data, temperature data, seismic data, and nuclear data; such a method wherein the method is conducted at a well site having a wellbore extending into the earth formation, the wellbore logging tool disposed in the wellbore; such a method including conducting a subsequent wellbore operation at the well site based on the final earth model; such a method wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

The present invention discloses a correction method for correcting wellbore logging data to account for shoulder bed effects, the method including generating wellbore logging data with a wellbore logging tool disposed in a wellbore in an earth formation, and overcorrecting the wellbore logging data.

It is, therefore, an object of at least certain preferred embodiments of the present invention to provide:

New, useful, unique, efficient, nonobvious systems and methods for earth modeling and for acquisition, analysis and interpretation of wellbore logging data; and, in certain aspects, for significantly faster analysis and interpretation;

Such systems and methods which result in a stable and accurate earth model for predicting formation parameters;

Such systems which may be used at a well site or at a location remote from the well site;

Such systems and methods useful with various different wellbore logging tools and useful with various types of wellbore logging data; and Such systems and methods which take into account more than one logging depth per layer of formation.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter hows others may later disguise it by variations in form or addition of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
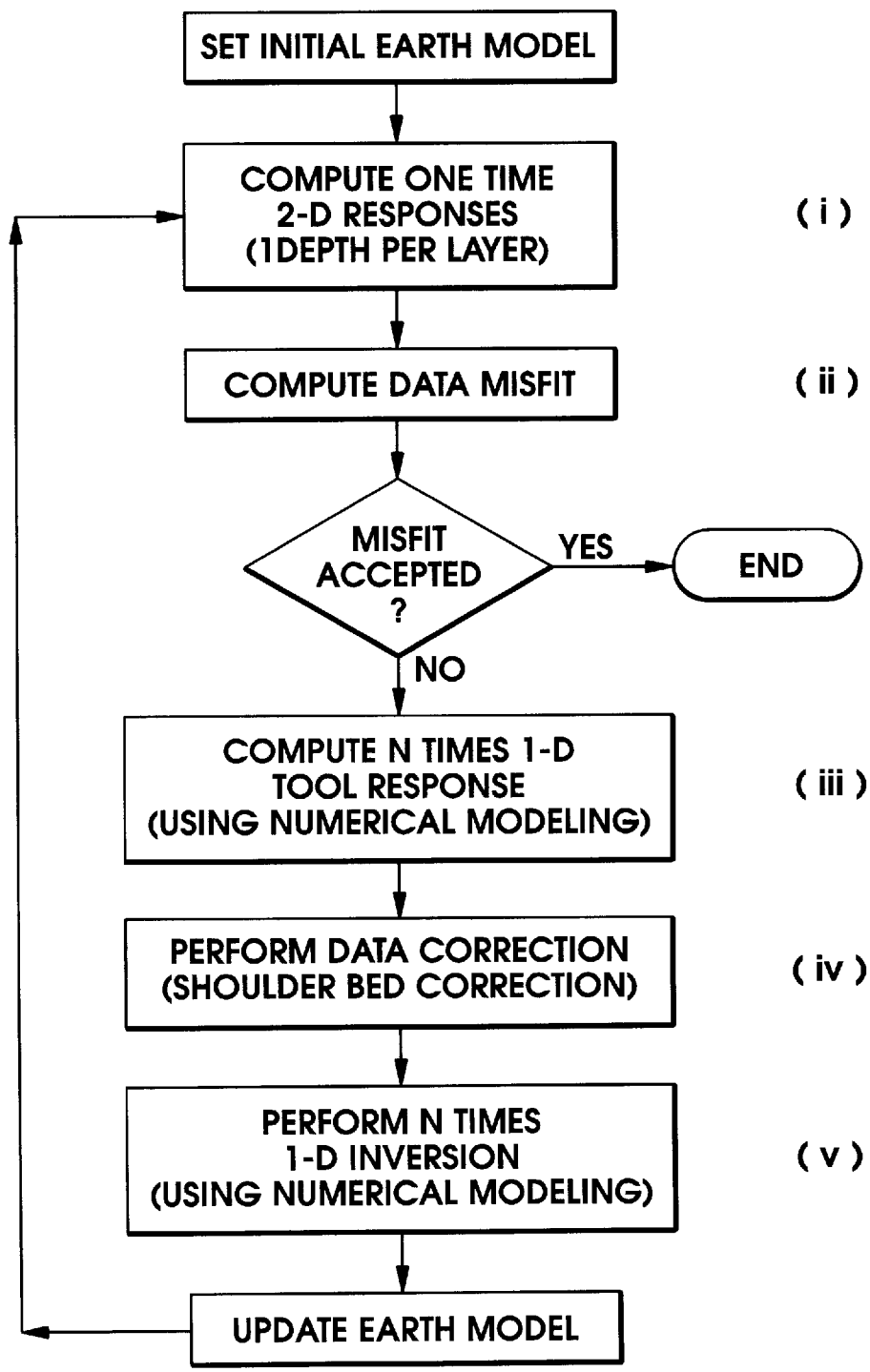
FIG. 1 is a schematic representation of a prior art method for interpreting wellbore logging data and producing an earth model of a formation.
Figure 2:
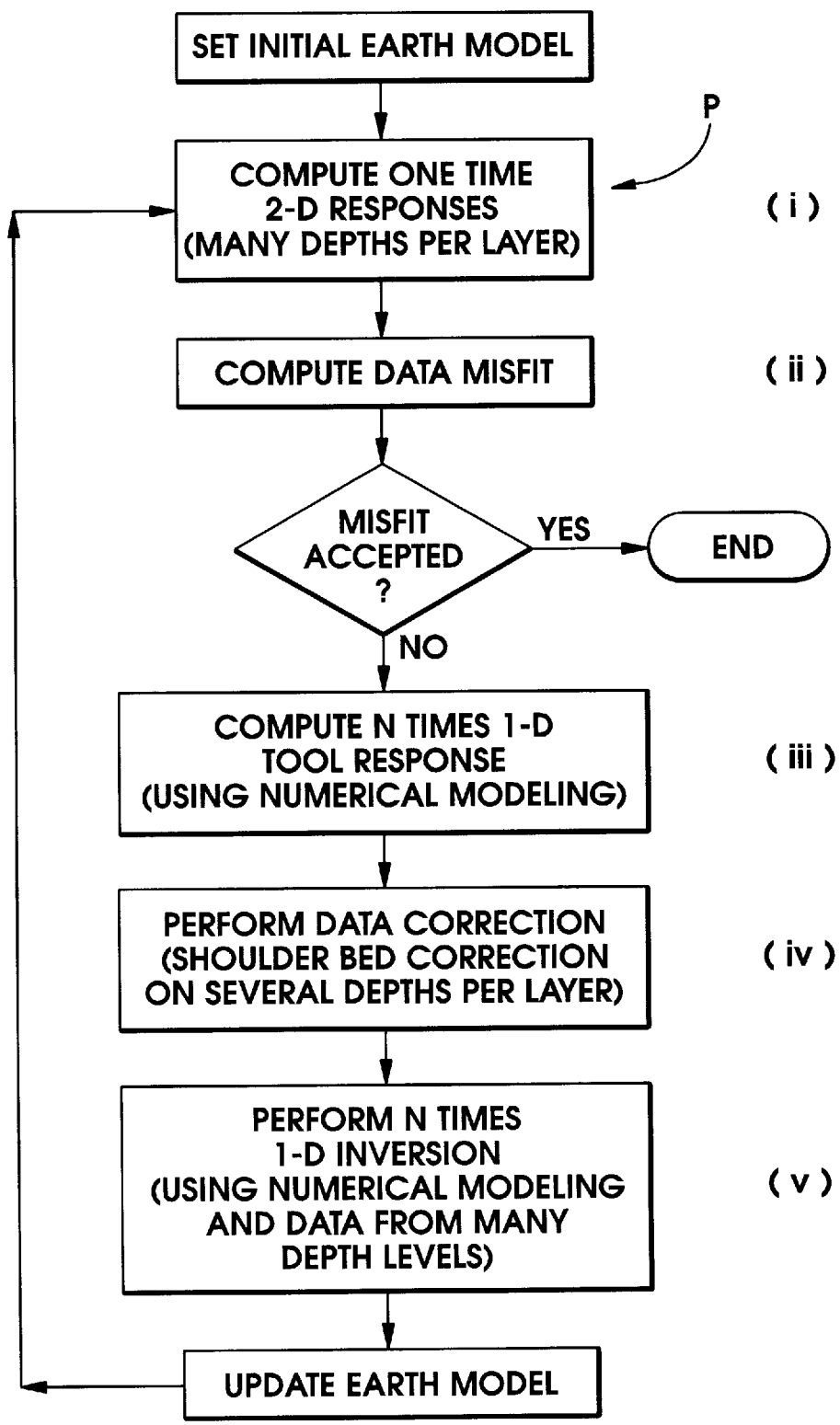
FIG. 2 is a schematic representation for interpreting any wellbore logging data and producing an earth model of a formation according to the present invention.

As shown in FIG. 2, a process P according to the present invention, is like the prior art process of FIG. 1, but various steps have computations done for several or many depths per layer rather than at one depth per layer. In step (i) the 2-D responses are computed for many depths per layer. In step (iv) the data correction is done on several depths per layer. In step (v) the 1-D inversion(s) are done with data from many depths levels.

Figure 3:
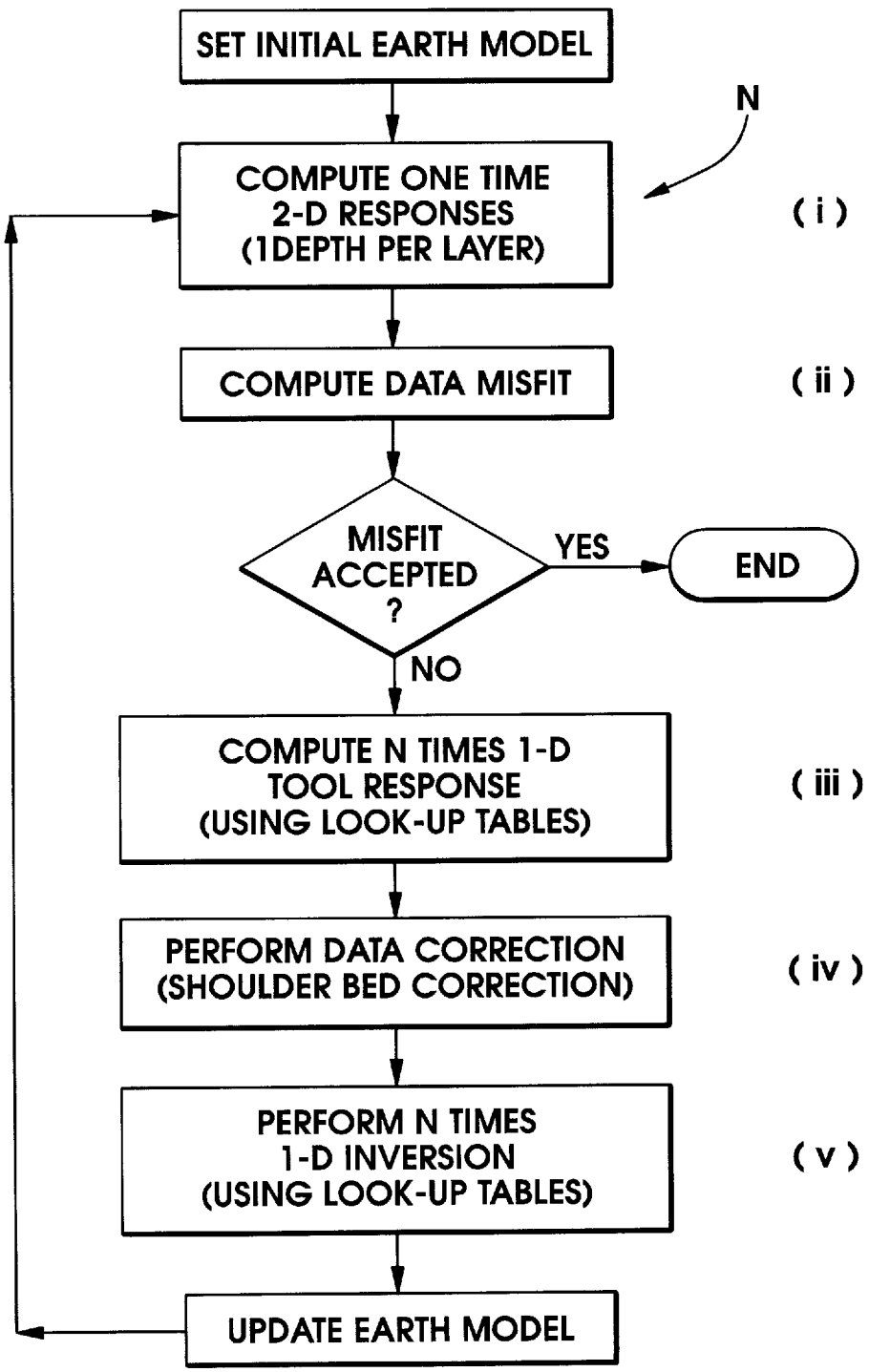
FIG. 3 is a schematic representation for interpreting any wellbore logging data and producing an earth model of a formation according to the present invention.

As shown in FIG. 3, a process N according to the present invention is like the process of FIG. 1, but includes a step for the 1-D inversion of corrected data which employs computer-memory-stored look-up tables of precalculated tool responses for one tool (for many data points per layer) or for a plurality of different types of tools (e.g., in one aspect any known wellbore logging tool) and consultation (with a computer) of such tables [the box labelled "Perform N times 1-D Inversion (using look-up tables)"]. Instead of needing to do relatively slow numerical forward modeling in inversion, a very fast "look-up" is done in the computer-stored look-up table which very quickly provides results such as would have been obtained by such numerical forward modeling. In the first 1-D forward modeling step the previously-described precalculated look-up tables are used ["Compute N times 1-D tool responses (using look-up tables)"] rather than actually conducting a complete 1-D numerical inversion model calculation for each selected formation layer. Alternatively, step (iii) of FIG. 1 may be conducted instead of step (iii) of FIG. 3.

Figure 4:
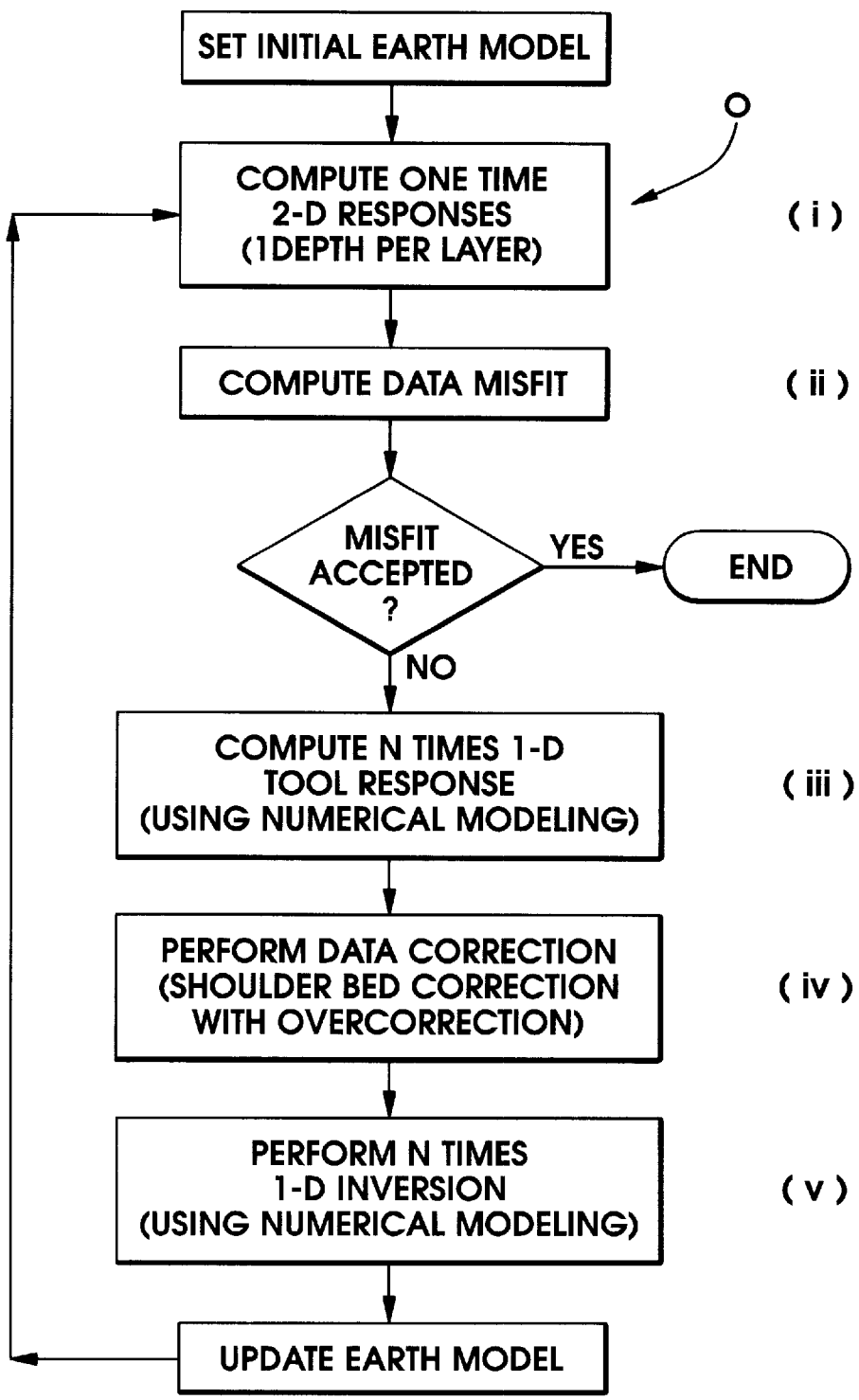
FIG. 4 is a schematic representation for interpreting any wellbore logging data and producing an earth model of a formation according to the present invention.

As shown in FIG. 4, a process O according to the present invention, is like the prior art process of FIG. 1, but includes a 2-D correction step in which an overcorrection procedure for shoulder bed effects is applied to the raw data ["Perform data correction (shoulder bed correction with overcorrection)"]. The overcorrected raw data is then used in the subsequent 1-D inversion at each layer to produce a new earth model.

Figure 5:
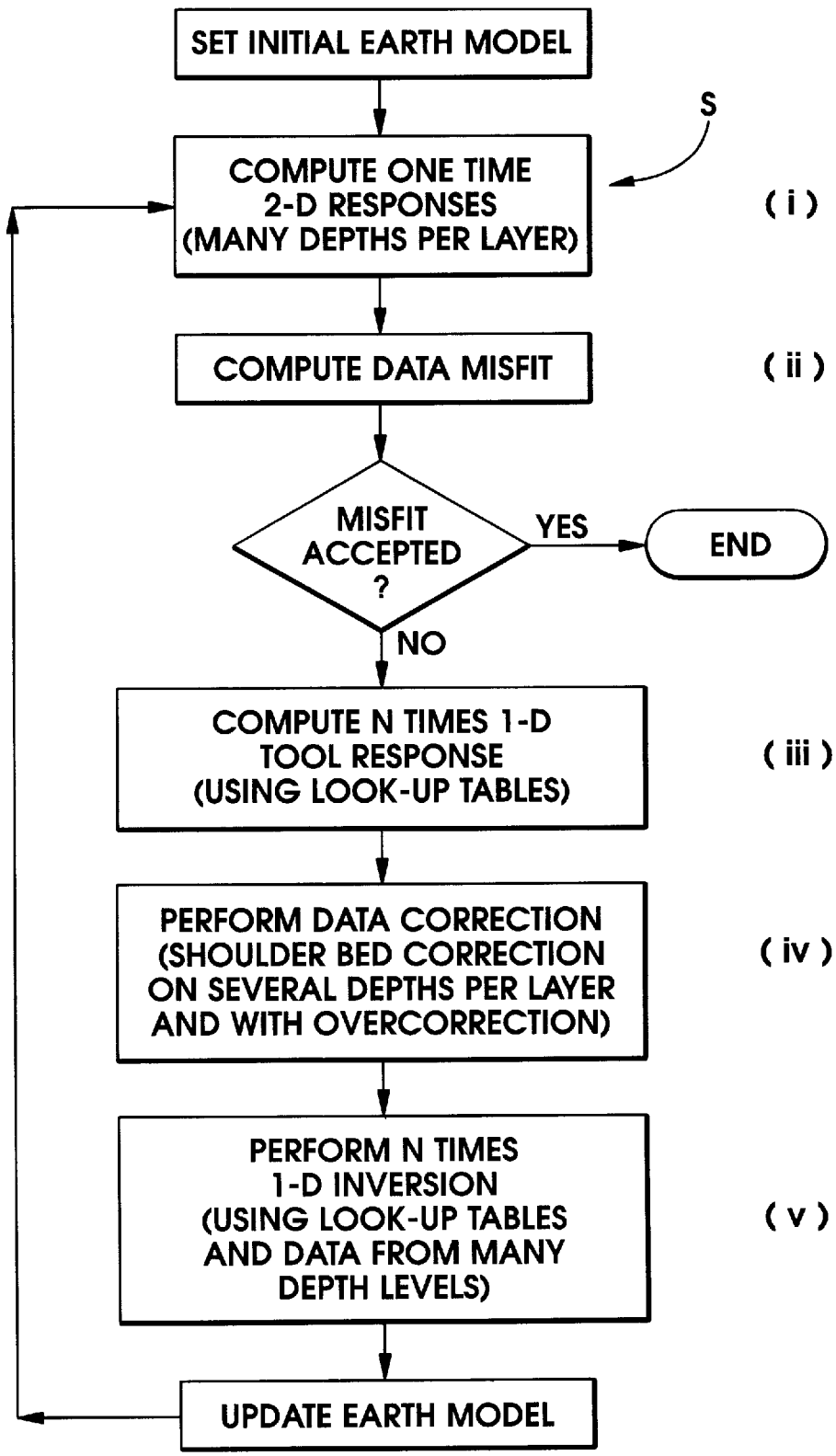
FIG. 5 is a schematic representation for interpreting any wellbore logging data and producing an earth model of a formation according to the present invention.

FIG. 5 discloses a process S according to the present invention (like the processes of FIGS. 2-4) which employs the non-numerical-calculation "LOOK-UP TABLES" steps of process N (FIG. 3); the computations at several or many depths per layer and with data from many depth levels of the process P (FIG. 2); and the data correction step of process O with overcorrection (FIG. 4) described above.

Figure 6:
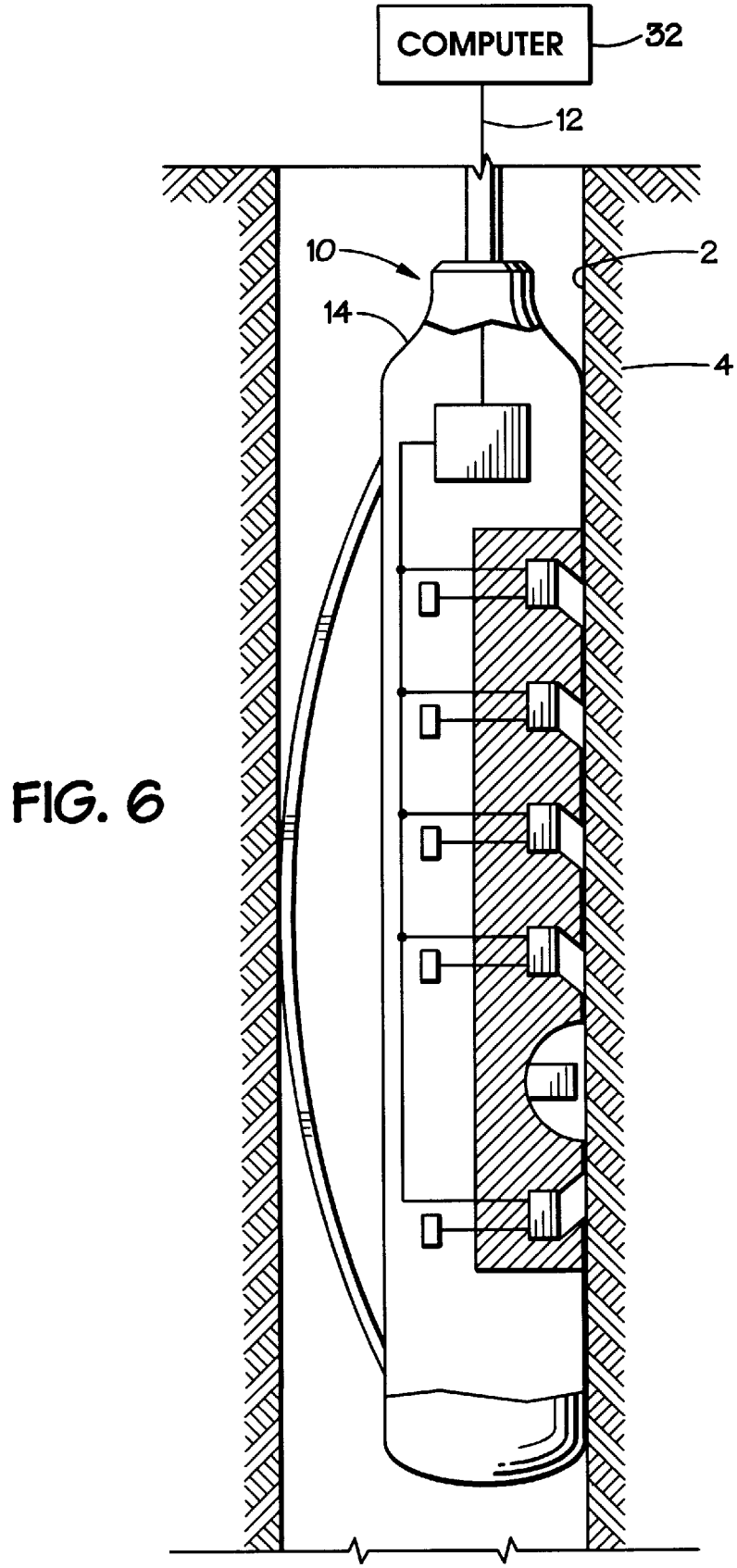
FIG. 6 is a side cross-sectional view of a prior art wellbore logging tool as shown in U.S. Pat. No. 5,530,243, co-owned with the present invention. This patent is incorporated fully herein for all purposes.

FIG. 6 discloses a typical prior art well logging tool as in U.S. Pat. No. 5,530,243 (incorporated by reference fully herein for all purposes) useful in systems and methods according to the present invention. It is to be understood that the tool of FIG. 6 is merely exemplary and that any well logging tool may be used according to the present invention. As shown in FIG. 6, a density logging apparatus 10 includes an elongated tool housing, or sonde 14, adapted to traverse a wellbore 2 drilled through earth formations 4. The sonde 14 can be attached to one end of an armored electrical cable 12. The cable 12, which is interconnected with a computer 32, can be used to lower the sonde 14 into the wellbore 2, to conduct electrical power to the tool 10 and to carry signals transmitted by the tool 10 to the earth's surface for observation and recording, as is understood by those skilled in the art. For purposes of the present invention the box labelled "COMPUTER" with the numeral 32 can be understood as part of a system at the well site according to the present invention. The computer is programmed to conduct the various misfit calculation, inversion, modeling, and correction steps of methods described herein.

All references identified herein are incorporated fully herein for all purposes.

In certain preferred embodiments use of the precalculated look-up tables for a certain tool [instead of going through the numerical 1-D inversion process using numerical forward modeling to obtain a model provided by the process] results in a system and method which requires only about 20% of the time required by prior art processes, and in certain most preferred embodiments, requires only about 10% of the time required by prior art processes. These look-up tables are produced by computing and storing a multiplicity of tool responses for various actual well logging tools.

In certain preferred embodiments use of the overcorrection technique as described above results in a two hundred percent temporal acceleration of a method, and in certain most preferred embodiments a three hundred percent acceleration or more, e.g. up to five hundred percent. For example, in one aspect a prior art method that takes about 3 hours will take about 35 minutes or less according to the present invention.

In certain preferred embodiments computation according to a method in accordance with the system of FIG. 5 is about ten times faster than that of FIG. 1. For example, a method of FIG. 1 that takes about 10 hours will take about 1 hour if the method of FIG. 5 is used. In such a case the use of look-up tables reduces the 10 hour time period to about 3.00 hours and the use of overcorrection reduces the 3.00 hours to about 30 minutes to an hour.

With a data overcorrection method according to the present invention, differences are determined between two-dimensional synthetic tool responses (produced by numerical 2-D forward modeling) and one-dimensional synthetic tool responses (produced by 1-D forward modeling). These differences are then multiplied by a predetermined coefficient which is related to an overrelaxation parameter. The result is then added to the raw data. An optimized coefficient is determined by a trial and error method in which coefficients of various values are tried. In certain aspects it is preferred that the coefficient range between 1 and 2. In one aspect the coefficient is an adaptive parameter that changes during an inversion process. One preferable coefficient is 1.2.

In one method according to the present invention a final earth model is produced, as described above, with a system at a well site. The system, in this aspect, includes a computer appropriately programmed for use in producing the final earth model. The system and method for producing the final earth model is then used at the well site in combination with different possible further steps, including but not limited to: producing the well; perforating a cased well; drilling one or more horizontal or multi-lateral wellbores; drilling deeper; plugging and abandoning the well; running new tools into the borehole, e.g. to acquire more data or to test the formation. The method according to the present invention may include any or a combination of any of these further steps.

Filed on even date herewith, co-owned with the present invention, and incorporated fully herein for all purposes is the U.S. application entitled "Systems And Methods For Forward Modeling of Well Logging Tool Responses," naming as inventors Alberto G. Mezzatesta (co-inventor of the present invention), Michael A. Jervis, David R. Beard, Kurt M. Strack, and Leonty A. Tabarovsky.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A method for producing a final earth model representing part of an earth formation having N layers, the method comprising
   a. generating an initial earth model based on raw data produced by a system including a wellbore logging tool at a location in a formation in a borehole through the earth,
   b. performing numerical 2-D forward modeling on the initial earth model to produce a set of two-dimensional synthetic tool responses for the wellbore logging tool,
   c. comparing the synthetic tool responses to the raw data to determine an amount of misfit between them,
   d. if misfit between the synthetic tool responses and the raw data is acceptable, saving and storing the initial earth model as the final earth model,
   e. if the misfit between the synthetic tool responses and the raw data is unacceptable, performing 1-D forward modeling on the initial earth model, producing an interim set of one-dimensional synthetic tool responses for the wellbore logging tool,
   f. overcorrecting the raw data for shoulder bed effects, producing overcorrected raw data,
   g. performing numerical 1-D inversion of the overcorrected raw data producing a secondary earth model,
   h. performing numerical 2-D forward modeling on the secondary earth model producing a secondary set of two-dimensional synthetic tool responses for the wellbore logging tool,
   i. comparing the secondary set of two-dimensional synthetic tool responses to the raw data as initially produced by the wellbore logging tool to determine an amount of misfit between them,
   j. if misfit between the secondary set of two-dimensional synthetic tool responses and the raw data as initially produced by the wellbore logging tool is acceptable, saving and storing the secondary earth model as the final earth model,
   k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model.

2. The method of claim 1 wherein N is one.

3. The method of claim 1 wherein N is at least two.

4. The method of claim 1 wherein the wellbore logging tool generates raw data from the group consisting of electrical resistivity data, acoustic data, vertical seismic profiling data, magnetic data, gravimetric data, temperature data, seismic data, and nuclear data.

5. The method of claim 1 wherein the acceptable misfit is 10% or less.

6. The method of claim 1 wherein the acceptable misfit is 5% or less.

7. The method of claim 1 wherein the acceptable misfit is 1.5% or less.

8. The method of claim 1 wherein the method is conducted at a well site having a wellbore extending into the earth formation, the wellbore logging tool disposed in the wellbore.

9. The method of claim 1 further comprising
   conducting a subsequent wellbore operation at the well site based on the final earth model.

10. The method of claim 9 wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

11. A method for producing a final earth model representing part of an earth formation having N layers, the method comprising
   a. generating an initial earth model based on raw data produced by a system including a wellbore logging tool at a location in a formation in a borehole through the earth,
   b. performing numerical 2-D forward modeling on the initial earth model to produce a set of two-dimensional synthetic tool responses for the wellbore logging tool,
   c. comparing the synthetic tool responses to the raw data to determine an amount of misfit between them,
   d. if misfit between the synthetic tool responses and the raw data is acceptable, saving and storing the initial earth model as the final earth model,
   e. if the misfit between the synthetic tool responses and the raw data is unacceptable, producing an interim set of one-dimensional synthetic tool responses for the wellbore logging tool by looking up said responses in a look-up table,
   f. correcting the raw data for shoulder bed effects, producing corrected raw data,
   g. performing numerical 1-D inversion of the corrected raw data producing a secondary earth model,
   h. performing numerical 2-D forward modeling on the secondary earth model producing a secondary set of two-dimensional synthetic tool responses for the wellbore logging tool,
   i. comparing the secondary set of two-dimensional synthetic tool responses to the raw data as initially produced by the wellbore logging tool to determine an amount of misfit between them,
   j. if misfit between the secondary set of two-dimensional synthetic tool responses and the raw data as initially produced by the wellbore logging tool is acceptable, saving and storing the secondary earth model as the final earth model,
   k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model.

12. The method of claim 11 wherein N is one.

13. The method of claim 11 wherein N is at least two.

14. The method of claim 11 wherein the wellbore logging tool generates raw data from the group consisting of electrical resistivity data, acoustic data, vertical seismic profiling data, magnetic data, gravimetric data, temperature data, seismic data, and nuclear data.

15. The method of claim 11 wherein the acceptable misfit is 10% or less.

16. The method of claim 11 wherein the acceptable misfit is 5% or less.

17. The method of claim 11 wherein the acceptable misfit is 1.5% or less.

18. The method of claim 11 wherein the method is conducted at a well site having a wellbore extending into the earth formation, the wellbore logging tool disposed in the wellbore.

19. The method of claim 11 further comprising
   conducting a subsequent wellbore operation at the well site based on the final earth model.

20. The method of claim 19 wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

21. A method for producing a final earth model representing part of an earth formation having N layers, the method comprising
   a. generating an initial earth model based on raw data produced by a system including a wellbore logging tool at a location in a formation in a borehole through the earth,
   b. performing numerical 2-D forward modeling on the initial earth model to produce a set of two-dimensional synthetic tool responses for the wellbore logging tool,
   c. comparing the synthetic tool responses to the raw data to determine an amount of misfit between them,
   d. if misfit between the synthetic tool responses and the raw data is acceptable, saving and storing the initial earth model as the final earth model,
   e. if the misfit between the synthetic tool responses and the raw data is unacceptable, performing 1-D forward modeling on the initial earth model, producing an interim set of one-dimensional synthetic tool responses for the wellbore logging tool,
   f. correcting the raw data for shoulder bed effects, producing corrected raw data,
   g. producing a secondary earth model by 1-D inversion of the corrected raw data using a look-up table of synthetic tool responses at a plurality of points for each layer of the earth formation,
   h. performing numerical 2-D forward modeling on the secondary earth model producing a secondary set of two-dimensional synthetic tool responses for the wellbore logging tool,
   i. comparing the secondary set of two-dimensional synthetic tool responses to the raw data as initially produced by the wellbore logging tool to determine an amount of misfit between them,
   j. if misfit between the secondary set of two-dimensional synthetic tool responses and the raw data as initially produced by the wellbore logging tool is acceptable, saving and storing the secondary earth model as the final earth model,
   k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model.

22. The method of claim 21 wherein N is one.

23. The method of claim 21 wherein N is at least two.

24. The method of claim 21 wherein the wellbore logging tool generates raw data from the group consisting of electrical resistivity data, acoustic data, vertical seismic profiling data, magnetic data, gravimetric data, temperature data, seismic data, and nuclear data.

25. The method of claim 21 wherein the acceptable misfit is 10% or less.

26. The method of claim 21 wherein the acceptable misfit is 5% or less.

27. The method of claim 21 wherein the acceptable misfit is 1.5% or less.

28. The method of claim 21 wherein the method is conducted at a well site having a wellbore extending into the earth formation, the wellbore logging tool disposed in the wellbore.

29. The method of claim 21 further comprising conducting a subsequent wellbore operation at the well site based on the final earth model.

30. The method of claim 29 wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

31. A method for producing a final earth model representing part of an earth formation having N layers, the method comprising a. generating an initial earth model based on raw data produced by a system including a wellbore logging tool at a location in a formation in a borehole through the earth, b. performing numerical 2-D forward modeling on the initial earth model to produce a set of two-dimensional synthetic tool responses for the wellbore logging tool, c. comparing the synthetic tool responses to the raw data to determine an amount of misfit between them, d. if misfit between the synthetic tool responses and the raw data is acceptable, saving and storing the initial earth model as the final earth model, e. if the misfit between the synthetic tool responses and the raw data is unacceptable, producing an interim set of one-dimensional synthetic tool responses for the wellbore logging tool by looking up said responses in a look-up table, f. overcorrecting the raw data for shoulder bed effects, producing overcorrected raw data, g. producing a secondary earth model by 1-D inversion of the overcorrected raw data using a look-up table of synthetic tool responses at a plurality of points for each layer of the earth formation, h. performing numerical 2-D forward modeling on the secondary earth model producing a secondary set of two-dimensional synthetic tool responses for the wellbore logging tool, i. comparing the secondary set of two-dimensional synthetic tool responses to the raw data as initially produced by the wellbore logging tool to determine an amount of misfit between them, j. if misfit between the secondary set of two-dimensional synthetic tool responses and the raw data as initially produced by the wellbore logging tool is acceptable, saving and storing the secondary earth model as the final earth model, k. if misfit between the secondary set of two-dimensional synthetic tool responses and the raw data as initially produced by the wellbore logging tool is unacceptable, again performing the steps e. f. and g. on the secondary earth model and then determining if a resulting earth model is acceptable as the final earth model.

32. The method of claim 31 wherein N is one.

33. The method of claim 31 wherein N is at least two.

34. The method of claim 31 wherein the wellbore logging tool generates raw data from the group consisting of electrical resistivity data, acoustic data, vertical seismic profiling data, magnetic data, gravimetric data, temperature data, seismic data, and nuclear data.

35. The method of claim 31 wherein the acceptable misfit is 10% or less.

36. The method of claim 31 wherein the acceptable misfit is 5% or less.

37. The method of claim 31 wherein the acceptable misfit is 1.5% or less.

38. The method of claim 31 wherein the method is conducted at a well site having a wellbore extending into the earth formation, the wellbore logging tool disposed in the wellbore.

39. The method of claim 31 further comprising conducting a subsequent wellbore operation at the well site based on the final earth model.

40. The method of claim 39 wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

* * * * *